Aug. 30, 1955     A. T. WILSON     2,716,352
ADJUSTING AND LOCKING DEVICE
Filed Aug. 31, 1950

INVENTOR
Allen T. Wilson
BY
ATTORNEY

United States Patent Office 2,716,352
Patented Aug. 30, 1955

2,716,352

ADJUSTING AND LOCKING DEVICE

Allen T. Wilson, Gloucester, N. J., assignor to Radio Corporation of America, a corporation of Delaware Application August 31, 1950, Serial No. 182,486

6 Claims. (Cl. 74—424.8)

The present invention relates to an improved adjusting and locking device for telescopically arranged members, and more particularly to an improved adjusting and locking device for use with an optical lens of the type employed, for example, with motion picture film projection apparatus.

In apparatus of this type, the lens is mounted for adjustment in axial directions to effect proper focus of the projected image. After the lens is properly focused, it is necessary to provide for locking the lens against movement. Various spring biased devices have been provided heretofore to accomplish this but they have been found to be unsatisfactory, either because they do not apply sufficient pressure to stop all vibratory movement of the lens with respect to its support or, in some cases, where an auxiliary locking means is provided, the force transmitted by the locking means is excessive and causes damage to the mount carrying the lens.

A primary object of the present invention, therefore, is to provide an improved adjusting and locking device for telescopically arranged members.

Another object of the present invention is to provide a locking device for an optical lens which will firmly hold the lens in an adjusted position.

Still another object of the present invention is to provide a locking device for an optical lens which will not injure the lens mount.

It is also an object of the present invention to provide an improved adjusting and locking device for an optical lens which can be quickly and easily adjusted.

Another object of the present invention is to provide an improved adjusting and locking device for an optical lens which is simplified in construction, highly efficient in use, and which can be constructed at a minimum of cost.

In accordance with the present invention, an adjusting and locking device is provided for telescopically arranged inner and outer members which comprises a detent carried by the outer member and normally engageable with the inner member. An adjustable tensioning member is provided for varying the biasing pressure of the detent on the inner member whereby the detent may be adjusted between a yieldable, unlocked position and a fully engaged, locked position to prevent relative movement of the members.

Figure 1:
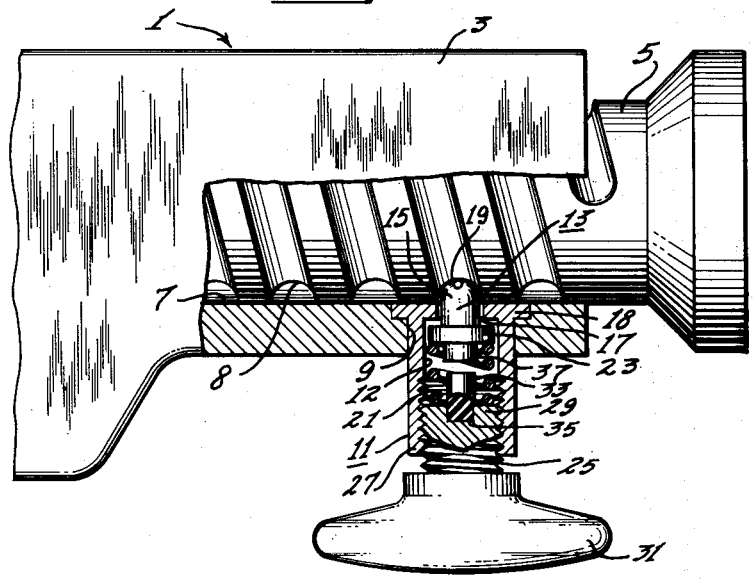
Figure 2:
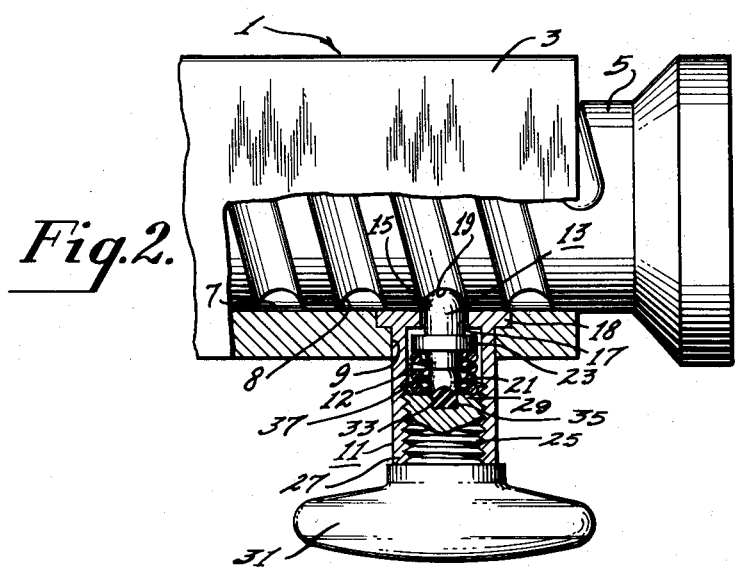

The novel features characteristic of the present invention, as well as additional objects and advantages thereof, will be between understood from the following detailed description when read in connection with the accompanying drawing, in which Figure 1 is a plan view, partly in section, of a preferred embodiment of the present invention, the parts being shown in an unlocked position, and Figure 2 is a view similar to Figure 1 but showing the parts in a locked position.

Referring more particularly to the drawing, wherein similar reference characters designate corresponding parts throughout, the present invention is applied to a lens mount 1 adapted to be attached to an optical apparatus (not shown).

The lens mount 1 comprises telescopically arranged inner and outer members in the form of a support or frame 3 and a ferrule or lens barrel 5 respectively. The support 3 comprises a bushing having a cylindrical bore 7 for slidably receiving the ferrule 5. The ferrule 5 comprises a hollow, cylindrical member having an optical lens (not shown) mounted therein. The exterior surface of the ferrule 5 is provided with a spiral groove or thread 8 to provide means for adjusting the lens in axial directions.

An opening 9 is provided in the wall of the bushing 3 and communicates with the bore 7 thereof. A hollow receptacle or cup-shaped member 11 having a bore 12 is securely mounted within the opening 9. A detent 13 is mounted within the receptacle 11 with an end 15 thereof normally extending into the bushing bore 7 through an opening 17 provided in the end 18 of the receptacle. The detent end 15 is provided with a rounded surface 19 to engage the thread of the ferrule 5.

A coil spring 21 is mounted within the receptacle 11 with one end in contact with a collar or flange 23 provided on the detent 13. A retractable member in the form of an adjusting bolt or screw 25 is mounted in the opposite end 27 of the receptacle 11 for varying the biasing pressure on the detent 13. The inner end 29 of the adjusting screw 25 normally engages the end of the coil spring 21 opposite that which engages the detent 13. A handle or knob 31 mounted on the outer end of the screw 25 facilitates adjustment thereof to effect compression of the spring 21 and force the detent end 15 to protrude into the bushing bore 7. Thus, by turning the screw 25, the spring 21 can be adjusted and tensioned to yieldingly hold the detent 13 in the receptacle 11 and normally in engagement with the ferrule 5. The ferrule 5 can then be moved axially to effect focal adjustment either by pushing it into or pulling it out of the bushing bore 7, in which case the detent 13 will ride over the ferrule exterior surface to permit approximate focal adjustment, or by rotating the ferrule in either direction within the bushing 3 so that the detent follows the groove 8 to permit fine adjustment.

Although the spring biased detent 13 will normally hold the ferrule 5 in an adjusted position, vibration originating in motor elements in a motion picture projection apparatus will cause movement of the ferrule in the bushing in which it is mounted. In order to hold the ferrule securely and prevent relative movement between the ferrule and its support 3, the adjusting screw 25 is provided with a pressure pad 33 of resilient material, such as rubber, or the like. The pressure pad 33 is mounted in a recess 35 provided in the inner end 29 of the adjusting screw. The pad 33 normally extends through the convolutions of the coil spring 21 and is arranged to engage the end 37 of the detent 13 opposite the rounded end 15.

In the disengaged, unlocked position, as shown in Figure 1, the adjusting screw 25 is withdrawn an amount sufficient to space the pad 33 from the detent 13. The detent 13 is biased against the ferrule 5 by the spring 21 and permits adjustment of the lens and ferrule. In order to lock the ferrule 5 against movement, the adjusting screw 25 is inserted an amount sufficient to force the pad 33 against the detent 13 and prevent any movement thereof. In the fully engaged, locked position, the rubber pressure pad 33 being a resilient member tends to limit the force exerted against the lens ferrule 5 and to prevent damage thereto.

From the foregoing description, it will be apparent that the present invention provides an improved, simplified adjusting and locking device for an optical lens. Although but a single, preferred embodiment of the present invention is illustrated and described, it will be recognized by persons skilled in the art that various changes and modifications thereof are possible within the spirit of the invention. For example, instead of using an adjusting screw 25 for applying pressure, it may be found desirable to use a rotatable shaft having a laterally extending pin disposed within a spiral slot provided in the wall of the receptacle member. Other changes of like nature are possible within the spirit of the present invention. Therefore, it is desired that the particular form of the present invention described herein shall be considered as illustrative and not as limiting.

What is claimed is:

1. An adjusting and locking device for a projection lens mounted in a ferrule provided with an external thread and a support therefor comprising a bushing having a bore for slidably receiving the lens ferrule, said adjusting and locking device comprising spring biased means extending through said bushing into said bore, said spring biased means being engageable with said ferrule, means for varying the biasing pressure of said ferrule engaging means, and means carried by said pressure varying means engageable with said ferrule engaging means for locking said lens against movement.

2. The invention as defined in claim 1 and wherein said adjusting and locking device includes a receptacle mounted on said bushing, said receptacle having a bore communicating with said bushing bore, said ferrule engaging means being disposed within said receptacle and normally biased to extend into said bushing bore in contact with said ferrule.

3. The invention as defined in claim 2 wherein said ferrule engaging means comprises a detent having one end thereof normally in contact with said ferrule and wherein said locking means comprises a resilient pressure pad attached to said pressure varying means and engageable with said detent.

4. The invention as defined in claim 1 wherein said pressure varying means comprises a retractable member mounted on said bushing, said retractable member being mounted for movement to an unlocked position whereby said locking means is disengaged from said spring biased means and for movement to a locked position whereby said locking means engages said spring biased means to secure said ferrule and said support against relative movement.

5. An adjusting and locking device for an optical lens mounted within a ferrule having a threaded external surface and a support therefor comprising a bushing having a bore for receiving said lens ferrule, said adjusting and locking device comprising a receptacle member carried by said bushing and communicating with said bushing bore, a detent slidably mounted within said receptacle member having an end portion thereof normally protruding into said bushing bore, said end portion being adapted to engage the exterior surface of said ferrule, spring biasing means mounted within said receptacle member in contact with said detent, and retractable means engageable with said spring biasing means for applying a biasing force on said detent, said retractable means including a portion thereof adapted to be brought into direct contact with said detent for locking said ferrule against movement with respect to said support.

6. The invention as defined in claim 5 and wherein said retractable means portion comprises a resilient member.

References Cited in the file of this patent

UNITED STATES PATENTS

| | | |
|---|---|---|
| 820,581 | La Londe | May 15, 1906 |
| 1,190,100 | Brown et al. | July 4, 1916 |
| 1,401,744 | Watson | Dec. 27, 1921 |
| 1,739,697 | Van Berkel | Dec. 17, 1929 |
| 2,061,448 | Bath et al. | Nov. 17, 1936 |
| 2,386,767 | Arens | Oct. 16, 1945 |
| 2,393,764 | Frank | Jan. 29, 1946 |
| 2,496,448 | Dunlavey | Feb. 7, 1950 |

FOREIGN PATENTS

| | | |
|---|---|---|
| 201,925 | Germany | Sept. 23, 1908 |
| 470,222 | France | Aug. 28, 1914 |
| 542,724 | Great Britain | Jan. 26, 1942 |